(12) United States Patent  (10) Patent No.: US 8,284,770 B1
Levis et al.  (45) Date of Patent: Oct. 9, 2012

(54) PHYSICAL LAYER SWITCHING AND NETWORK PACKET SWITCHING INTEGRATED INTO A HYBRID SWITCHING MODULE

(75) Inventors: Jeffrey W. Levis, Eagan, MN (US); Aaron M. Cordes, Bloomington, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 242 days.

(21) Appl. No.: 12/481,204

(22) Filed: Jun. 9, 2009

(51) Int. Cl.
*H04Q 11/00* (2006.01)

(52) U.S. Cl. ........ 370/386; 370/352; 370/353; 370/354; 370/387; 370/388

(58) Field of Classification Search .......... None
See application file for complete search history.

(56) References Cited

U.S. PATENT DOCUMENTS

| | | | |
|---|---|---|---|
| 7,480,303 B1 * | 1/2009 | Ngai ............................ 370/395.5 |
| 7,904,599 B1 * | 3/2011 | Bennett ......................... 709/249 |
| 2004/0052527 A1 * | 3/2004 | Kirby .............................. 398/57 |
| 2005/0021740 A1 * | 1/2005 | Bar et al. ....................... 709/224 |
| 2007/0280223 A1 * | 12/2007 | Pan et al. ....................... 370/360 |
| 2009/0092145 A1 * | 4/2009 | Kondo ........................... 370/422 |
| 2011/0044693 A1 * | 2/2011 | Kelly et al. .................... 398/116 |

* cited by examiner

*Primary Examiner* — Ayaz Sheikh
*Assistant Examiner* — Sori Aga
(74) *Attorney, Agent, or Firm* — Hamre, Schumann, Mueller & Larson, P.C.

(57) ABSTRACT

A hybrid switch module configured on a common support structure providing networks the ability to automatically reconfigure point-to-point links, per software controls, to optimize network topology by combining a network switching device with a physical layer switch using switching logic. The hybrid switch module is an integrated unit that can operate at a physical layer, routing signals between dedicated ports, and operate as a packet switch for non-dedicated ports.

20 Claims, 5 Drawing Sheets

PHYSICAL LAYER SWITCHING AND NETWORK PACKET SWITCHING INTEGRATED INTO A HYBRID SWITCHING MODULE

FIELD

The disclosure relates to a switch that can operate both as a physical layer switch, routing signals between dedicated ports, and simultaneously operate as a packet switch for non-dedicated ports.

BACKGROUND

In one known network system, as illustrated in FIG. 1, optical signals are transmitted from network nodes 1 to a fixed backplane 2 via external communication paths 3. The fixed backplane 2 is permanently configured to route the optical signals to a packet switch 4 or to other network paths 5 via specific communication paths 7. The packet switch 4 converts the optical signals to electrical signals and feeds the signals to the crossbar fabric 6, which is an interconnected network of switching devices. In order to reconfigure a communications path 7, through the fixed backplane 2, the path must be manually unplugged from a specific port on the fixed backplane and physically reconnected to a different port. Without physical manipulation, the communication path 7 cannot be reallocated. In addition, the fixed backplane 2 and the packet switch 4 are individual units, each requiring its own slot or mounting area on an equipment rack.

In another known network system, as shown in FIG. 2, an electronically reconfigurable patch panel 10 is implemented which allows for reconfiguration of the communication paths 11 at the patch panel. The optical signals are transmitted from network nodes 12 to an electronically reconfigurable patch panel 10 via external communication paths 14. The patch panel 10 converts the optical signals to electrical signals using electro-optical transceivers 15. The electrical signals are routed on reconfigurable communication paths 11 internal to the patch panel 10. The communication paths 11 are determined according to the input from a separate computing device (not shown). The electrical signals are then converted back to optical signals using electro-optical transceivers 15, are output, and the optical signals are transmitted to a packet switch 16, which converts the optical signals back to electrical signals, using electro-optical transceivers 15, and feeds these signals to the crossbar fabric 17. In order to implement this solution, there must be another slot or mounting area on the equipment rack for another piece of equipment. In addition, the electro-optical transceivers have a high failure rate, have a high power consumption rate, and generate substantial heat when compared to other electronics components. Therefore, a separate electronically reconfigurable patch panel 10 is not an adequate solution for environments where space, power, and cooling are issues, particularly in an avionics environment computing system.

SUMMARY

A hybrid switch module configured on a common support structure providing networks the ability to automatically reconfigure point-to-point links, per software controls, to optimize network topology by combining a network switching device with a physical layer switch using switching logic. The hybrid switch module can operate at a physical layer, routing signals between dedicated ports, and operate as a packet switch for non-dedicated ports.

The switch module combines a physical layer switch using switching logic with a switching device, both being reconfigurable based on commands from a controller. The switch module is advantageous in that reconfiguration of communication paths between nodes is done automatically without the physical or manual manipulation of the network nodes. Reconfiguring in this manner is less time consuming than the physical act of unplugging and plugging in network nodes. Another advantage is that a common support structure or a single replaceable unit is provided that is compact, uses less power, and is less expensive than having separate specific purpose units. Additionally, reliability is improved.

Applications of a hybrid switch module include any environment where size, weight, and power are considerations. Example applications of a hybrid switch module include, but are not limited to: systems which require the network to be reconfigured, space constrained systems, environments where cooling is an issue, and environments where power supply is limited. Users could consist of commercial or public enterprises, for example, such as avionics, telecommunications companies, military, Department of Defense, and any entity that is lacking space for complex equipment setups. In essence, users of a hybrid switch module could comprise any entity that has size, weight, and power limitations.

One example of a hybrid switch module contains at least one physical layer switch using switching logic, at least one layer 2/3 packet switch (multilayer switch) and at least one fabric controller, all contained on a common support structure. The fabric controller is linked to and controls the physical layer switch and the packet switch. The physical layer switch and the packet switch are linked. Network nodes are linked to the physical layer switch.

In some embodiments, when compared to a conventional configuration, there could be a reduction in the quantity of electro-optical transceivers required, resulting in a reduction in power consumption, cost, space, and heat generation. An additional benefit is that due to the high failure rate of electro-optical transceivers, the overall reliability of the hybrid switch module could be improved.

One advantage of the hybrid switch module is the allowance for reconfiguration of point-to-point links to optimize network topology to the desired task while avoiding packet switch issues. In space constrained systems, such as avionics, this flexible architecture does not add complexity to the system and is reconfigurable.

A single replaceable hybrid switch module contained on a common support structure is compact, uses less power, generates less heat, and is less expensive than having two separate specific purpose units. The architecture supports automatic re-configuration of communication paths between nodes while providing extremely low latency, privacy, flexibility, high bandwidth and guaranteed bandwidth while keeping size, weight, power, and cost to a minimum.

DRAWINGS

DETAILED DESCRIPTION

A hybrid switch module is described that is configured on a common support structure, by combining a network switching device with a physical layer switch using switching logic, which provides networks the ability to automatically reconfigure point-to-point links, per software controls, to optimize network topology. While the hybrid switch module can be configured as a line replaceable circuit board, other embodiments can be implemented that do not require the circuit board structure as long as the hybrid switch module is designed to combine the physical layer switch and the network switching device on or within a common support structure. The hybrid switch module can operate at a physical layer, routing signals between dedicated ports, and operate as a packet switch for non-dedicated ports.

Figure 1:
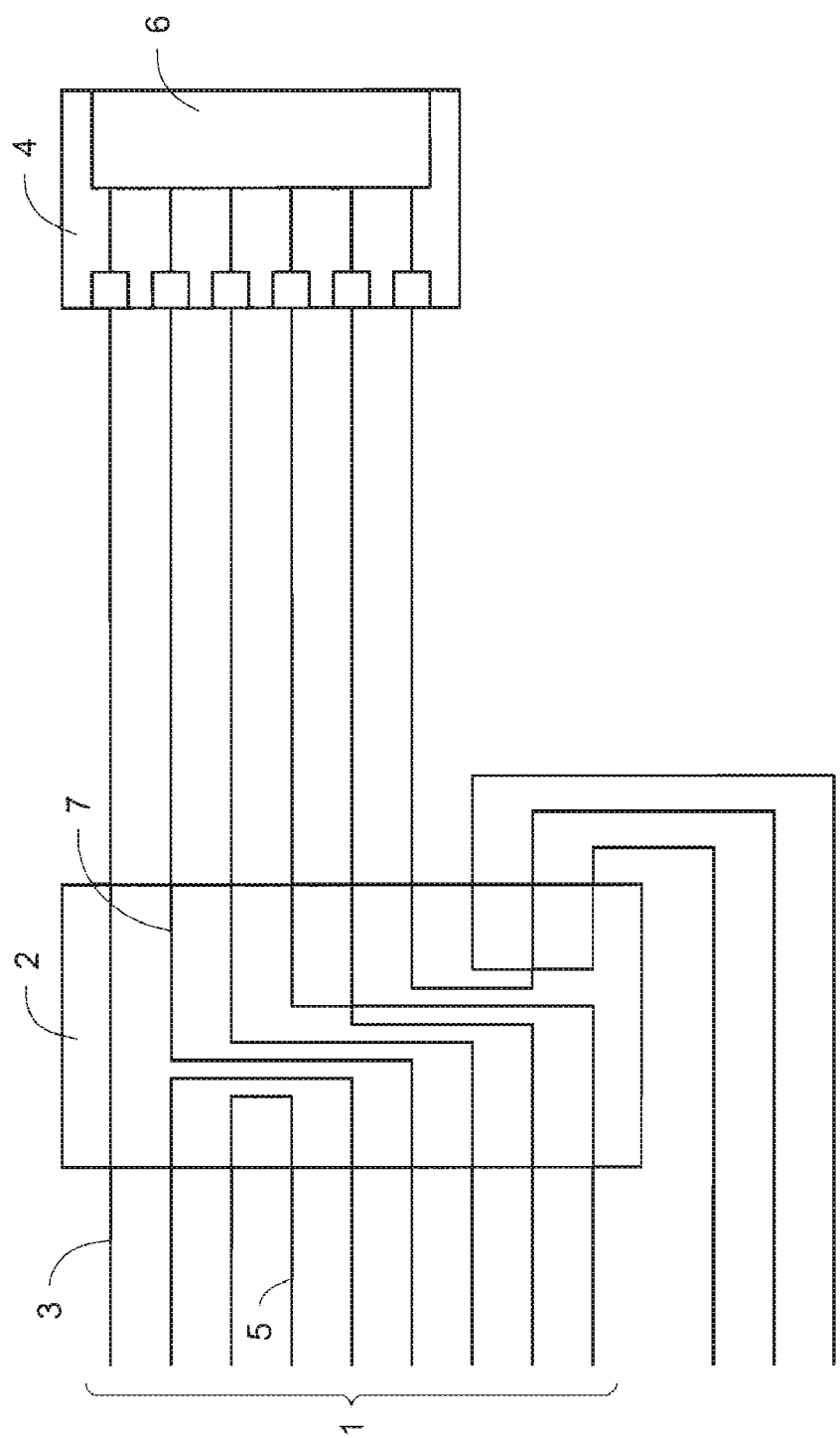
FIG. 1 is a diagrammatic view of a known network system employing a backplane connected with a packet switch.
Figure 2:
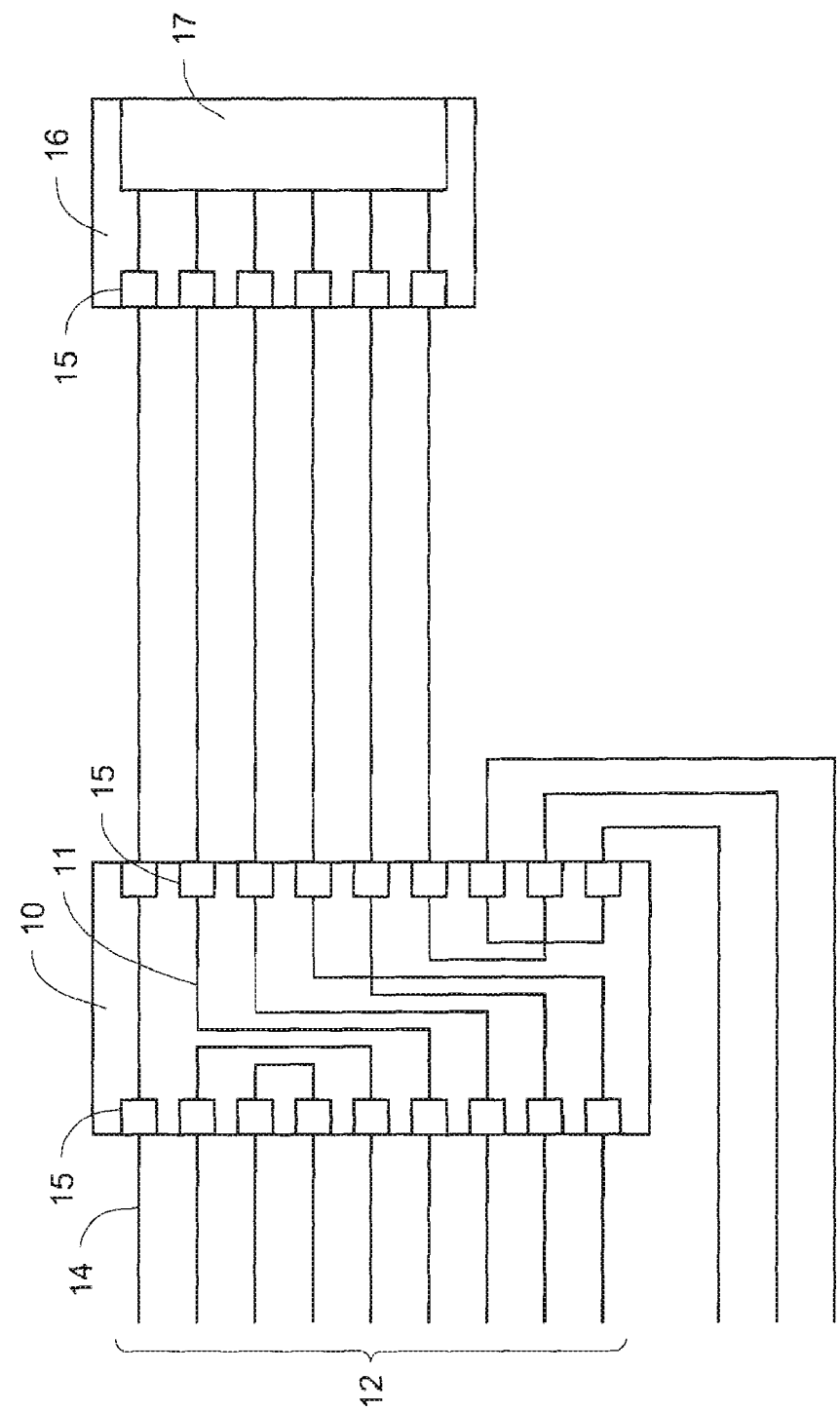
FIG. 2 is a diagrammatic view of a known network system employing an electronically reconfigurable patch panel connected with a packet switch.
Figure 3:
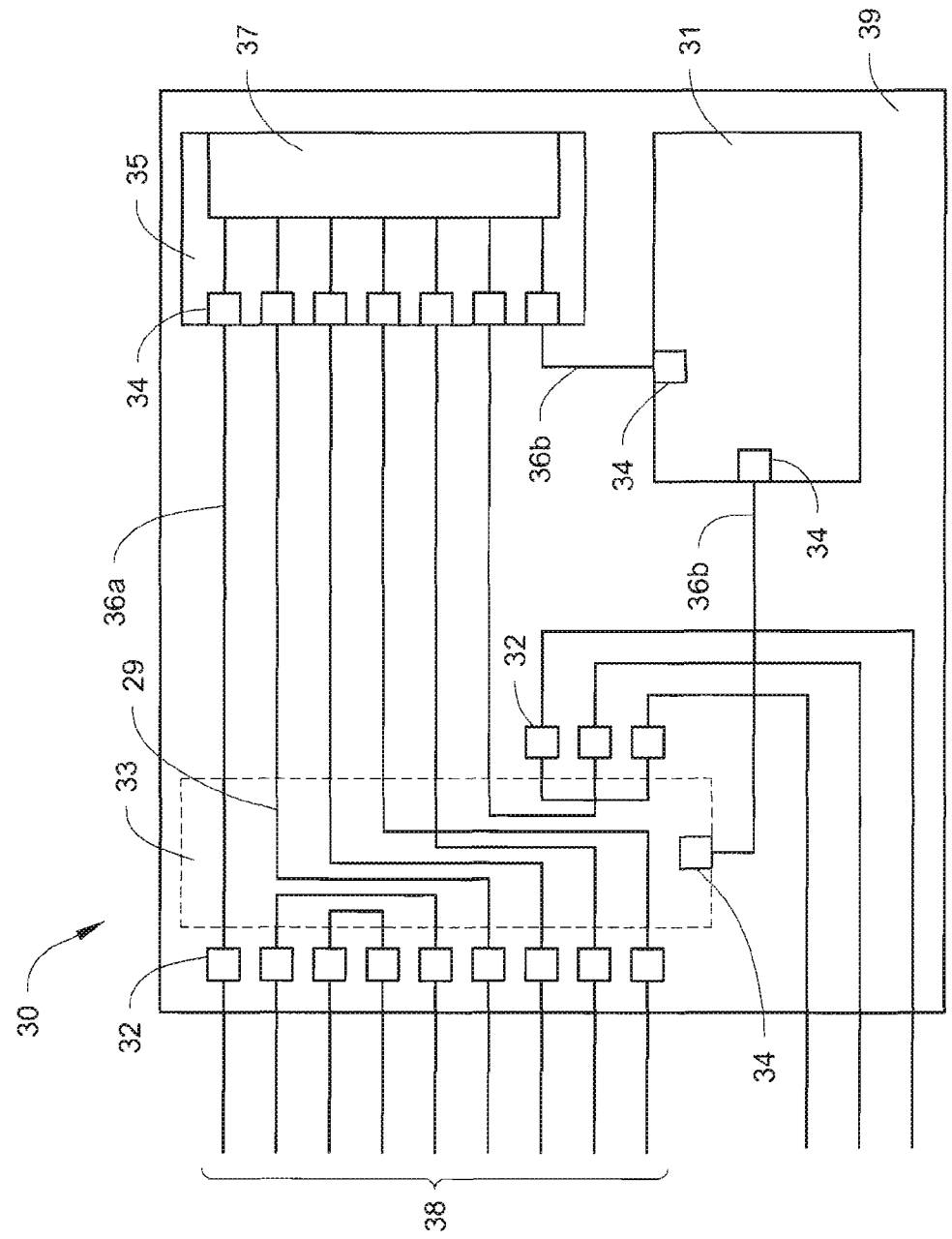
FIG. 3 is a diagrammatic view of an exemplary hybrid switch module containing a common support structure with a physical layer switch, a layer 2/3 packet switch, and a fabric controller in one unit.

Referring to FIG. 3, one example of a hybrid switch module 30 contains at least one fabric controller 31, at least one physical layer switch 33, and at least one switching device 35, all contained on a common support structure 39 and connected by communication links 36a, 36b. The switching device 35, in this example, is a layer 2/3 packet switch incorporating a crossbar fabric 37. Integration of the electronic components on a common support structure saves space versus having each component on a separate circuit board or housed as an individual device. The hybrid switch module 30 does not increase module count and number of module types since the electronic components do not require their own individual circuit board or housing.

The support structure 39 could be, but not limited to, for example, a circuit board, a substrate, or a module that is "line replaceable", i.e. to be easily removed or inserted within the slot in an equipment rack or in an electronic device.

Mounting of the electronic components on a common support structure 39 could include, but not be limited to: integration of the component into the physical structure of the common support structure 39; adhering the component, by any type of adhering agent, to the common support structure 39; fastening the component to the common support structure 39 with any type of fastening device; placing the component into a socket, slot or any other type of receptacle specifically provided on the common support structure 39 for that component; or, use of the wired connection to hold the component on the common support structure 39.

Referring to FIG. 3, the fabric controller 31 is a computing device or processor that is linked via the controller communication link 36b and electrical interface 34 to the physical layer switch 33 and linked via the controller communication link 36b and an electrical interface 34 to the layer 2/3 packet switch 35. In another embodiment, the physical layer switch 33 and the switch 35 could be linked to the fabric controller 31 through hardwire connections. The fabric controller 31 controls and manages the physical layer switch 33, through software, thereby managing the configuration of the communication paths 29. The fabric controller 31 controls and manages the layer 2/3 packet switch 35 and crossbar fabric 37, through software, thereby managing configuration of the packet switches. The hybrid switch module 30 contains at least one fabric controller 31.

The physical layer switch 33 is used to provide connectivity between the network nodes 38 and the layer 2/3 packet switch 35. The hybrid switch module 30 contains at least one physical layer switch 33. The physical layer switch 33 acts like an electronic patch panel and reconfigures the communication paths 29 electronically. The physical layer switch 33 is protocol independent and does not inspect incoming traffic or make routing decisions. Communication paths 29 within the physical layer switch 33 are reconfigured electronically, per software controls from the fabric controller 31, without the manual effort of unplugging and plugging in a network node 38 or manually reassigning, per user input of data, a network node 38.

As shown in the embodiment of FIG. 3, the physical layer switch 33 could contain a plurality of electro-optical transceivers 32 that connect to the network nodes 38. In other embodiments, the physical layer switch 33 could connect to the network nodes 38 by electrical or wireless interfaces. Additionally, connection of the physical layer switch 33 to the network nodes 38 could be accomplished with any combination of electrical, optical, and wireless interfaces. In the embodiment shown in FIG. 3, the physical layer switch 33 is hardwired to the switch communication links 36a. In another embodiment, the physical layer switch 33 could contain electrical interfaces that connect to the communication links 36a. In this embodiment, the communication links 36a are connected to the electrical interfaces 34 of the layer 2/3 packet switch 35. In another embodiment, the communication links 36a could be hardwired to the layer 2/3 packet switch 35. Other embodiments could use any combination of electro-optical transceivers 32, electrical interfaces 34, or hardwiring.

The physical layer switch 33 is able to be reconfigured electronically to reconfigure the communications paths 29 and reallocate processing nodes. The nodes could be allocated between signal processing domains and between signal processing and general processing domains. The physical layer switch 33 routes signals between dedicated ports so network nodes could be allocated to maintain low latency, high bandwidth, flexibility, and dedicated bandwidth, if required.

The switching device 35 is described as being a layer 2/3 packet switch. However, the switching device 35 could also be at least one of, for example, a router 47 (see FIG. 4), a guard 57 (see FIG. 5), or any combination of switching devices. The layer 2/3 packet switch 35 is used to perform, for example, OSI model Layer 3 routing and Layer 2 switching functions. As shown in the embodiment of FIG. 3, the layer 2/3 packet switch 35 contains electrical interfaces 34 and a crossbar fabric 37. In another embodiment, the switching device 35 could be hardwired to the communication links 36a. The crossbar fabric 37 is an interconnected network of high performance packet switches containing input and output ports and transports the data from the inputs to the outputs. The switching could be implemented, for example, through a fast hardware such as a higher-density Application-Specific Integrated Circuits (ASIC), which allows real-time switching and forwarding without reducing the overall transmission rate. In another embodiment the switching could be implemented in high-speed programmable logic such as a Field Programmable Gate Array (FPGA).

As shown in the embodiment of FIG. 3, the crossbar fabric 37 is managed and controlled by the fabric controller 31 through communication link 36b and electrical interface 34. In another embodiment, the crossbar fabric 37 and the fabric controller 31 could be connected by a hardwire connection. Control of the crossbar fabric 37 allows for the assignment of active connections for specific purposes. For example, a special circuit could require low latency and very high bandwidth. In this example, the crossbar fabric 37 could be controlled by the fabric controller 31 to set up specific Quality of Service parameters in the crossbar switch for a particular link. The link is reconfigurable so that it could be reassigned as a general circuit or as a different special circuit depending on the specific requirements of the network.

Figure 4:
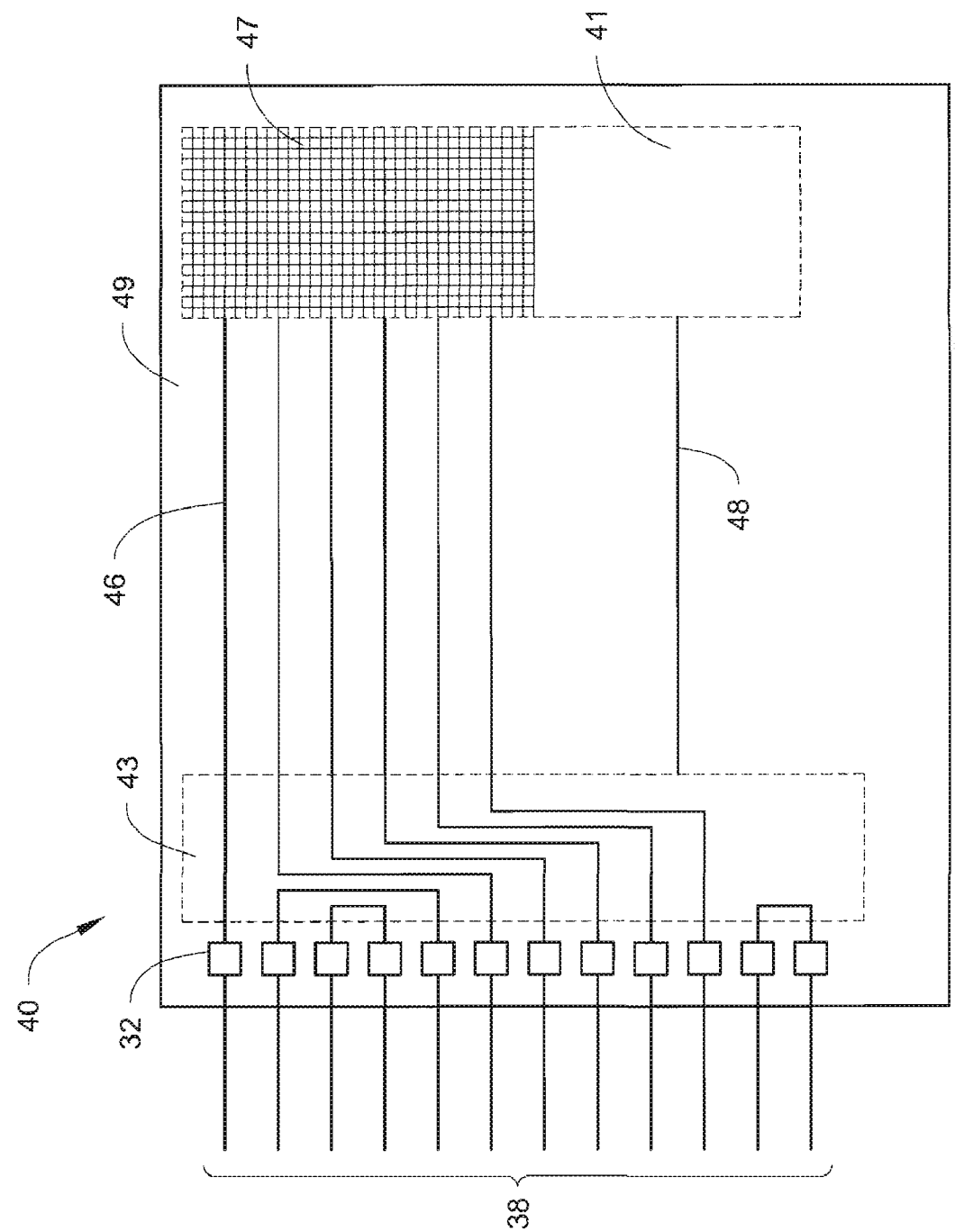
FIG. 4 is a diagrammatic view of a hybrid switch module containing a common support structure with a physical layer switch and a router integrating a control function in one unit.

Referring to FIG. 4, another embodiment of a hybrid switch module 40 contains at least one physical layer switch 43 and at least one controller 41 integrated with a switching device 47, for example a router, all mounted and contained on a common support structure 49. In this embodiment, the physical layer switch 43 could contain a plurality of electro-optical transceivers 32 that connect to the network nodes 38. In other embodiments the physical layer switch 43 could contain any combination of electrical, optical, and wireless interfaces that connect to the network nodes 38. In this embodiment, switch communication links 46 are hardwired to the physical layer switch 43 and to the router 47. Other embodiments could contain electrical interfaces on the physical layer switch 43 and router 47 or a combination of electrical interfaces and hardwiring in order to link the devices. Other embodiments could use any combination of electro-optical transceivers 32, electrical interfaces 34, and hardwiring to link the devices. The physical layer switch 43 is hardwired or linked using electrical interfaces to the controller 41 through a controller communications link 48.

The router 47 is an intelligent switching device in that it has knowledge of where to send data based on characteristics of the data. In addition, it is able to look at more than the immediate network and send data beyond the local network. As shown in the embodiment of FIG. 4, the controller 41 is integral to the router 47 and also controls the physical layer switch 43.

Figure 5:
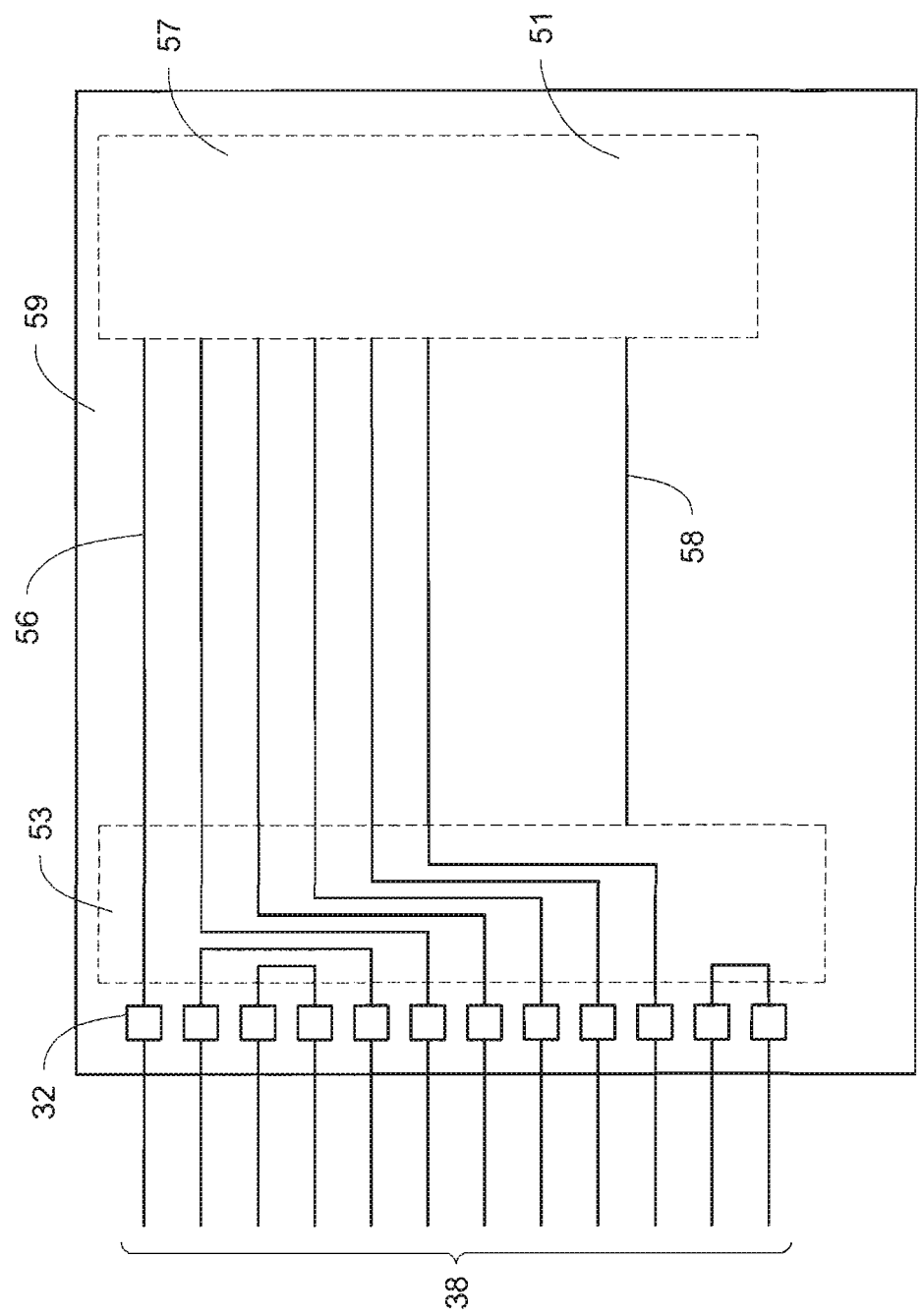
FIG. 5 is a diagrammatic view of a hybrid switch module containing a common support structure with a physical layer switch and a guard function integrating a control function in one unit.

Referring to FIG. 5, another embodiment of a hybrid switch module 50 contains at least one physical layer switch 53 and at least one switching device 57, for example a guard, the guard 57 including a controller 51 capable of controlling the physical layer switch 53, all mounted and contained on a common support structure 59.

The physical layer switch 53 contains a plurality of electro-optical transceivers 32 that connect to the network nodes 38. In other embodiments the physical layer switch 53 could contain any combination of electrical, optical, and wireless interfaces that connect to the network nodes 38. In this embodiment, the physical layer switch 53 and the guard 57 are hardwired to switch communication links 56. Another embodiment would incorporate electrical interfaces on the physical layer switch 53 and the guard 57 to link the devices with the communication link 56. Other embodiments could use any combination of electro-optical transceivers 32, electrical interfaces 34, and hardwiring. The physical layer switch 53 is also hardwired or linked using electrical interfaces to the controller 51 through a controller communications link 58.

The guard 57 is configured to provide rules based data separation and re-grading. The guard 57 acts as a rules-based router by looking at the data and based on the rules will or will not allow the data to be routed to a specific location. Therefore, the guard 57 controls the physical layer switching capability to ensure nodes at different security levels do not communicate directly with each other. The guard 57 could allow data to move from a lower level of security to a higher level but not vice versa.

The electro-optical transceivers 32 act as the input/output ports of the electronics components providing the physical interface between an electronic component and a circuit. The electro-optical transceivers 32 convert optical signals into electrical signals and electrical signals into optical signals. The electro-optical transceivers 32 combine the transmitter and receiver thereby providing both output and input interfaces. In other embodiments, separate receivers and transmitters could be used.

The electrical interfaces 34 act as the input/output ports of the electronics components providing the physical interface between an electronic component and a circuit. The electrical interface 34 receives an electrical signal and outputs an electrical signal.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A hybrid switch module, comprising:
   a circuit board;
   a physical layer switch mounted on the circuit board containing communication paths that are able to be logically reconfigured, the physical layer switch is configured to act like an electronic patch panel, and the physical layer switch contains a plurality of electro-optical transceivers for connection to network nodes;
   a switching device mounted on the circuit board and connected to the physical layer switch; and
   a controller mounted on the circuit board and connected to the physical layer switch and connected to the switching device, wherein the controller controls and reconfigures the physical layer switch and the switching device, and the controller is physically separate from and is not part of the physical layer switch.

2. The hybrid switch module of claim 1, wherein the connections between the controller and the physical layer switch and between the controller and the switching device are direct electrical connections, and the connections between the physical layer switch and the switching device are electrical connections.

3. The hybrid switch module of claim 1, wherein the physical layer switch includes at least one wireless interface.

4. The hybrid switch module of claim 1, wherein the physical layer switch includes at least one electrical interface.

5. The hybrid switch module of claim 1, wherein the switching device includes a plurality of electrical interfaces.

6. The hybrid switch module of claim 1, wherein the controller includes a plurality of electrical interfaces.

7. The hybrid switch module of claim 1, wherein the switching device is a layer 2/3 packet switch.

8. The hybrid switch module of claim 7, wherein the layer 2/3 packet switch contains a crossbar fabric.

9. The hybrid switch module of claim 1, wherein the switching device is a router.

10. The hybrid switch module of claim 9, wherein the router integrates a control function.

11. The hybrid switch module of claim 1, wherein the switching device is a guard.

12. The hybrid switch module of claim 11, wherein the guard integrates a control function.

13. The hybrid switch module of claim 1, wherein the switching device does not contain electro-optical transceivers.

14. A hybrid switch module, comprising:
   a support structure that is removable and insertable as a single unit within a slot in an equipment rack or in an electronic device;

a physical layer switch mounted on the support structure, the physical layer switch including communication paths that are able to be logically reconfigured and a plurality of electro-optical transceivers configured to be connected to a plurality of network nodes, the physical layer switch is configured to act like an electronic patch panel;

a reconfigurable switching device mounted on the support structure and connected to the physical layer switch by a plurality of switch communication links to receive electrical data signals from the physical layer switch; and a controller mounted on the support structure and connected to the physical layer switch and connected to the switching device by respective controller communication links, wherein the controller controls and reconfigures the physical layer switch and the switching device using electrical control signals transmitted over the controller communication links, and the controller is physically separate from and is not part of the physical layer switch;

wherein the physical layer switch, the switching device and the controller are removable and insertable together with the support structure.

15. The hybrid switch module of claim 14, wherein the inputs of the physical layer switch further comprise at least one wireless interface or electrical interface.

16. The hybrid switch module of claim 14, wherein the switch communication links directly connect the physical layer switch to the switch device.

17. The hybrid switch module of claim 14, wherein the switching device is a layer 2/3 packet switch that contains a crossbar fabric, the switching device is a router, or the switching device is a guard that acts as a rules-based router.

18. The hybrid switch module of claim 14, wherein the switching device includes a plurality of electrical interfaces and does not contain electro-optical transceivers.

19. The hybrid switch module of claim 14, wherein the physical layer switch is protocol independent and does not inspect incoming traffic and does not make decisions on configuring its communication paths that provide communication paths between the reconfigurable switching device and the network nodes.

20. The hybrid switch module of claim 14, wherein the controller is directly connected to the physical layer switch and directly connected to the switching device.

* * * * *